United States Patent [19]

Mayumi et al.

[11] 4,435,842
[45] Mar. 6, 1984

[54] PROGRAMMABLE CHANNEL SELECTING APPARATUS

[75] Inventors: Kuzuaki Mayumi, Joyo; Yoshihiro Fujiwara, Hirakata; Toshio Tokuda, Hirakata; Toshiaki Suzuki, Hirakata, all of Japan

[73] Assignee: Matsushita Electric Industrial Co., Ltd., Osaka, Japan

[21] Appl. No.: 357,092

[22] Filed: Mar. 11, 1982

Related U.S. Application Data

[63] Continuation of Ser. No. 192,489, Oct. 1, 1980, abandoned, which is a continuation of Ser. No. 5,178, Jan. 22, 1979, abandoned.

[30] Foreign Application Priority Data

Jan. 26, 1978 [JP] Japan .................................. 53-8157
Jul. 7, 1978 [JP] Japan .................................. 53-83385
Jul. 7, 1978 [JP] Japan .................................. 53-83392

[51] Int. Cl.³ .......................... H04N 5/76; H04B 1/16
[52] U.S. Cl. .................................... 455/181; 455/186; 455/231; 358/337; 369/7; 369/19
[58] Field of Search ............... 455/171, 181, 185, 186, 455/231; 358/188, 335, 337; 360/33.1; 369/6, 7, 19

[56] References Cited

U.S. PATENT DOCUMENTS 4,193,120  3/1980  Yello ...................................... 369/7

OTHER PUBLICATIONS

User's Manual for "MN 1400 Series 4-Bit One-Chip Microcomputers", Matsushita Electronics Corporation, 2/77.

Primary Examiner—Jin F. Ng
Attorney, Agent, or Firm—Stevens, Davis, Miller & Mosher

[57] ABSTRACT

A programmable channel selecting apparatus to be disclosed is comprised of a manually operated switch for selecting desired channels and for inputting preset times for desired channel reception, a channel selecting circuit for driving a tuner and a channel indicator in manual/auto channel selecting mode, a channel preselecting circuit which, in channel preselection mode, memorizes a desired channel and a desired time for the channel reception in advance while at the same time causes a channel indicator to indicate the preselected channel and in auto-channel selection mode, applies a preselected channel signal to the channel selecting circuit when time reaches the preset time, those being all connected a common signal line, and an inhibiting circuit for preventing an erroneous operation. With such a construction, inputting and displaying of a selected channel and a preset or preselected channel can be made through one system of a channel preselection switch and a channel display. The programmable channel selecting apparatus is well adapted for home-use VTRs.

2 Claims, 13 Drawing Figures

C: DISCRIMINATION OF COINCIDENCE  G: GATE  L: LATCH
S: SYNCHRONIZING CIRCUIT

4,435,842

PROGRAMMABLE CHANNEL SELECTING APPARATUS

This is a continuation of application Ser. No. 192,489 filed Oct. 1, 1980, which in turn is a continuation of application Ser. No. 5,178 filed Jan. 22, 1978, both abandoned.

BACKGROUND OF THE INVENTION

The present invention relates to improvements over a programmable channel selecting apparatus used in a television receiver, a radio receiver, a video tape recorder with a television tuner or the like.

In the conventional VTR for home use, when a specific channel is subjected to an automatic video or picture recording at a preset or preselected item (this operation will be referred simply to automatic video recording), the tuner is previously set to the specific station and the time the video recording starts is preset by a timer. With this presetting, a power source is automatically turned on to effect the video recording.

There has recently been marketed a long-playing video tape recorder with a recording/playback time as long as 2 or 4 hours. The programmable timer function of the improved recent VTR is not satisfactory with one time or ON/OFF control. Several times of ON/OFF control are needed for the recent one. Another trend for the recent VTR is a subsequent preselection of a plurality of channels, not a single one, in automatic picture recording. Also desirable is that another channel can be preselected while a specific channel has been selected and held for automatic video recording or while a specific channel has manually been selected and held. One of the simplest systems for satisfying these desires, being considered as much as possible at the present, in which, while the channel selected content being held in a tuner is unchanged as it is, another channel is preselected, is such that a channel selection switch and a channel preselection switch are separately provided together with the corresponding channel indicators. Such two channel-selection systems including channel selection switches and channel indicators, provided in a single VTR set is troublesome when a user operates it, leading to hindrance of smooth operation and erroneous operation. Particularly in the case of home-use VTRs, needed are simple operation and no special skill for VTR operation.

SUMMARY OF THE INVENTION

Accordingly, an object of the invention is to provide a programmable channel selecting apparatus in which, in the light of the problems of the prior arts, emphasis in design is placed on the improvement of the operability of the apparatus, with a construction that a single channel selection system including a channel selection switch and its related channel indicator is provided and a channel selection/holding operation is independent of a channel preselection operation with no interference therebetween.

Another object of the invention is to provide a programmable channel selecting apparatus in which a specific channel is memorized in television tuners, audio tuners or the like and the memorized contents is indicated in a flashing manner by using an indicator circuit and a drive circuit in order to make it easy to check the memorized contents.

Another object of the invention is to provide a programmable channel selecting apparatus in which, even if the channel already selected by a tuner is the same as that to be preselected, it can memorize the preselected channel.

Major features of the invention reside in that it is possible to preset a plurality of times for ON/OFF operations and that, while a selected channel being held in manual or automatic video-recording mode is locked, it is possible to preselect another channel.

Other objects and features of the invention will be apparent from the following description taken in connection with the accompanying drawings.

DESCRIPTION OF THE PREFERRED EMBODIMENTS

Figure 1:
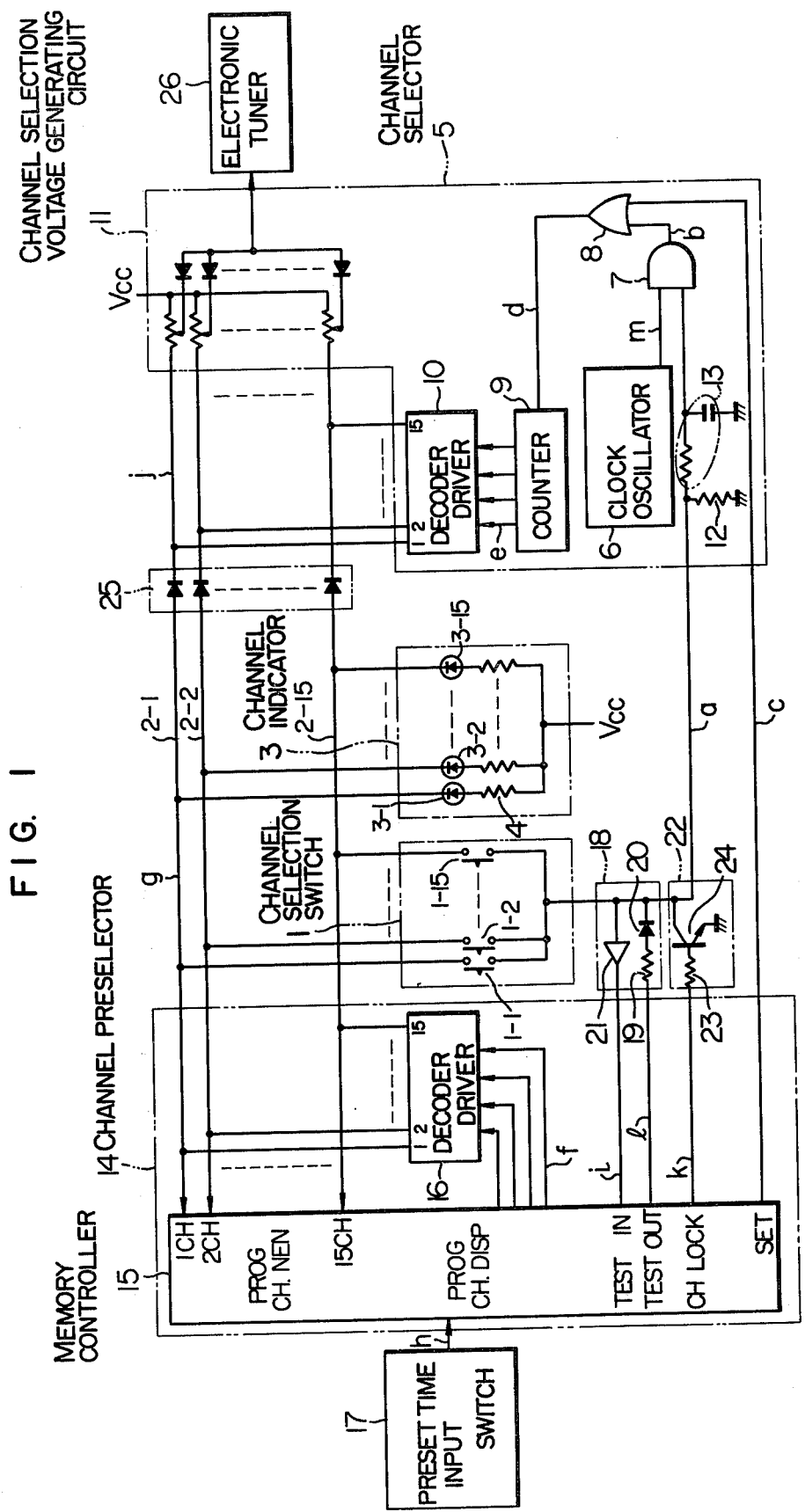
FIG. 1 shows a block diagram of a programmable channel selecting apparatus used in a VTR for home use which is an embodiment according to the invention.

Referring now to FIG. 1, there is shown in block form a programmable channel selecting apparatus used in VTRs for home use which is an embodiment according to the invention. In FIG. 1, reference numeral 1 designates a channel selection switch unit including fifteen switching elements 1-1 to 1-15. One-side ends of the switching elements are commonly connected to each other and the other ends thereof are connected to signal lines 2-1 to 2-15, respectively. The switch unit 1 is used to select a channel desired at present time and to preselect a channel or channels. A channel indicator designated by reference numeral 3 is comprised of fifteen channel indicators 3-1 to 3-15 for indicating a channel selected and being held and a preselected channel. The channel indicating element may be a light emission diode (LED), for example. The channel indicating elements are connected at one-side terminals to a power source Vcc through a resistor 4 and at the other side terminals to the signal lines 2-1 to 2-15. A channel selection circuit 5 is comprised of a clock oscillator 6 for effecting a channel-selection scanning, an AND gate 7 enabled by a return signal a, an OR gate for ORing a manual channel selection signal b which is an output signal of the AND gate 7 and an automatic channel selection signal c, a counter 9 for counting a channel selection scanning signal d which is an output signal of the OR gate 8, a decoder driver 10 for decoding a channel selection binary signal e, a channel selection voltage generating circuit 11, a pull-down resistor 12, and an integrator circuit 13. In manual channel selection mode, the channel selection circuit 5 responds to a return signal a corresponding to a channel selected by the channel selection switch 1 to drive an electronic tuner 26 and a channel indicator 3. In automatic channel selection mode, it responds to an automatic channel selection signal c corresponding to a preselected channel to drive the same ones. A channel preselecting circuit 14 is comprised of a memory control circuit 15, a decoder driver 16 for decoding a channel preselection binary signal f derived from the memory control circuit 15. To the memory control circuit 15 are inputted signals g carried by the signal lines 2-1 to 2-15, a preset time signal h derived from a preset time input switch 17 and a switch detection signal j derived from a switch on-off detection circuit 18. The memory control circuit 15 is comprised of a random access memory (RAM) for storing the preset time, the preselected channel, a timer portion, a comparing circuit which compares the present time with a preselected time to check whether both the times are coincident to each other, and a control circuit for controlling them. The switch on off detection circuit 18 is comprised of a current adder including a resistor 19 and a diode 20, and a voltage detection circuit 21. Reference numeral 22 designates a first inhibit circuit including a resistor 23 and a transistor 24 and reference numeral 25 designates a second inhibit circuit comprising diodes connecting to signal lines 2-1 to 2-15. An electronic tuner represented by numeral 26 includes an RF amplifier, a mixer and a local oscillator. In the tuner 26, the tuning frequency is determined by a channel selection voltage from a channel selection voltage generator 11 and the oscillating frequency of the local oscillator also is determined by the same.

The operation of the programmable channel selecting apparatus thus far described will be given. The operation of the apparatus is classified into the following four modes. (1) A mode for setting a timer to a desired time. In this mode, time of a timer portion within the memory control circuit 15 is set to the instant time.

(2) A manual video-recording mode. In this mode, the tuner 26 selects a channel by the channel selection switch 1 and the selected channel is indicated by the channel indicator 3.

The video signal output from the tuner 26 is recorded by a VTR. At this time, the timer portion of the memory control circuit 15 operates merely as a clock. Firstly, the operation of the apparatus is described for a state that the selected channel is held. The channel selection switch 1 is open and therefore the return signal a becomes LOW in level through a pull down resistor 12. When the return signal a is LOW level, the AND gate 7 is closed so that the channel selection scanning signal d becomes LOW level and the content of the counter 9 is held. The channel selection binary signal e is output as an output signal from the counter 9 thereby to determine a decoder input condition of the decoder driver 10. The decoder driver 10 is of open collector type by an NPN transistor, and decodes the binary signal e into fifteen signals. Accordingly, the output for any of the input conditions is necessarily given by a single signal line of the fifteen signal lines and the corresponding single NPN transistor is made in ON state. Only one signal in the channel selection signals j becomes LOW to select a voltage at the sliding terminal of the corresponding variable resistor in the channel selection voltage generating circuit 11. The sliding terminal voltage selected selects the corresponding channel or station. In the outputs of the decoder driver 10, the one in OFF state is pulled up in level HIGH by a pull-up resistor provided in the decoder driver 10. The channel selection voltage controls variable capacitance diodes provided in the electronic tuner 26, thereby to determine the frequencies of the local oscillator and the resonance circuit for reception of the channel to be selected. The channel selection signal j forwardly biases only a single corresponding diode in an inverse current-flow prevention circuit (second inhibit circuit) 25 comprising diodes. Accordingly, current flows into a light emitting diode (LED) of the channel indicator 3 corresponding to the channel selection signal j thereby to selectively light only the channel indicator selected and being held. At this time, the channel selection inhibiting (channel lock) signal k and switch on-off detection signal l are LOW level. Accordingly, the transistor 24 is in OFF state and no current flows into a diode 20.

The output of the decoder driver 16 which is decoded when all the inputs are LOW level is not used as the channel selection signal g. Therefore, by causing the channel preselection binary signals f to all be LOW level, it is possible to render all the output signals of the decoder driver 16 to be in OFF state. The automatic channel selection signal b also is LOW so that it does not influence the channel selection. The above is the operational mode when one channel is previously held.

Figure 2:
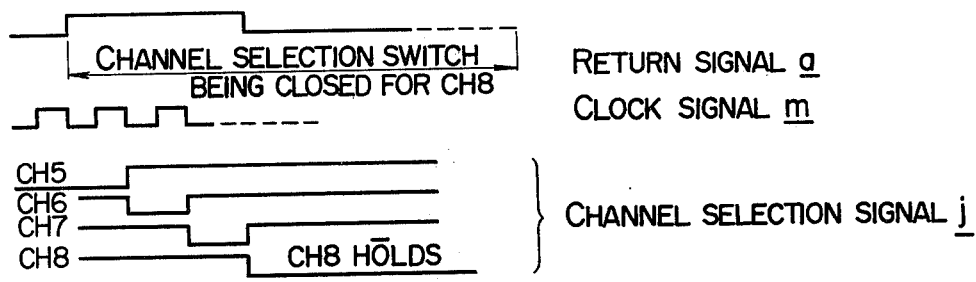
FIGS. 2, 3 and 4 show sets of waveforms useful in explaining the operation of the embodiment shown in FIG. 1.

How to select a channel in the manual video recording will be given below. The timing diagrams in this channel selection is shown in FIG. 2. Upon the closing of one of the channel selection switching elements of the unit 1, the return signal a from the decoder driver 10 is integrated by the integrator 13 for application to the AND gate 7. Usually, the return signal becomes HIGH level when the channel selection switch 1 is closed. If closed is a switching element of the channel selection switch 1 corresponding to the same channel as that selected by the tuner 26, the return signal a remains LOW level. When the return signal is HIGH level, the channels are scanned, while when it is LOW, the scanning is stopped to hold the corresponding channel. Assume now that a channel 5 was already selected and held. When the switching element 1-3 of the channel selection 1 is pushed, the return signal a becomes HIGH since the output j corresponding to the channel 8 of the decoder driver 10 becomes HIGH. Then, the AND gate 7 opens to permit a clock signal m to pass therethrough so that it produces the manual channel selection signal b and then the channel selection scanning signal d through the OR gate 8. Upon receipt of the signal, the counter 9 counts the output clock signals from the oscillator 6 to scan the channel selection contents. The output of the counter 9 is decoded so that the corresponding channel selection signal j is made LOW in level, as described above. The channel selection signal j is further fed back to the channel selection switch 1 to become the return signal a thereby to form a loop so as to control the counter 9 for the channel selection scanning. With progression of the channel selection scanning, the channel selection signal j corresponding to the channel with the switching element of the channel selection switch 1 being closed, becomes LOW level. At this time, the return signal a also becomes LOW. In this case, it becomes LOW when the channel 8 is selected. The operation as mentioned above is instantaneously conducted at high speed and therefore there is no need for intentionally long pressing of the channel selection switch 1. When the return signal a becomes LOW, the channel selection signal d becomes LOW and the counter 9 stops to hold its count. When the return signal a once becomes LOW, the related circuit is locked in the above-mentioned holding state and afterwards no scanning is made even if the channel selection switch 1 is continuously pressed. The above-mentioned operation is the channel selection operation for manual video recording.

(3) The third operation mode is a preselection mode for automatic video recording. The preselection mode permits the preselection and memorization of a time when a video recording should be automatically started, e.g. minute, hour, date, recording period of time, and a channel number. The preselected starting time is input by means of the preselect or preset time input switch 17.

In this channel preselection mode, the channel selection content of the tuner 26 and the content of the channel selector 5 must be retained. The channel to be preselected is selected by the channel selection switch 1 and is stored in the memory control circuit 15 while at the same time is indicated by the channel indicator 3. At this time, the channel indicator 3 indicates two channel; the channel selected by the tuner 26 and the channel preselected. In order to distinguish one from the other, it is desirable to indicate the preselected channel in flashing manner. In this preselection mode, the channel selection inhibit signal k becomes HIGH in level under control of the memory control circuit 15. As a result, the transistor 24 is turned ON, one side of the channel selection switch 1 is held at LOW level, and the return signal a is made LOW, whereby the channel selection scanning is inhibited. Then, when the switching element of the channel selection switch 1 corresponding to the channel to be preselected is closed, the corresponding channel preselection signal g becomes LOW. At this time, the channel with the LOW level signal g is stored as the preselected channel in the RAM of the memory control circuit 15. Incidentally, in this memory control circuit 15, when the channel selection signal j makes only one preselection signal g LOW level via the diode 25, its state is always memorized. When, through the channel preselection operation, another channel preselection signal g becomes LOW level, the channel with the signal which has newly become LOW level is memorized as a preselected channel. When any of the channels is not preselected, the channel indicated by the channel selection signal j is being stored as a preselected channel. In order to check the preselected channel, the memory control circuit 15 produces a preselection binary signal f to light the channel indicator 3 by the decoder driver 16.

When the channel selection switch 1 is closed, or the preselected channel is indicated by the decoder driver 16, there is a possibility that the channel preselection signal g, which is not related to the channel selection signal j, becomes LOW level. At this time, the diode in the inverse current-flow prevention circuit 25 is inversely biased to permit only one channel selection signal j to be maintained at LOW level. Therefore, the channel selection content of the channel selector 5 is fixed without being influenced. The operation mentioned above is the channel preselection operation for preselecting a channel other than the channel selected by the tuner 26. For example, in case where, when the program of the channel 1 is currently watched, the channel 8 has already been preselected, the preselected channel can be changed into another channel except the channel 1, as in the above-mentioned manner.

In the above case, however, when it is desired to change the preselected channel from the channel 3 to the channel 1 (which is currently held or watched), even if the channel selection switch 1 is operated, it is impossible to change the preselected channel to the channel 1. More specifically, when it is desired to preselect the same channel as that selected by the tuner, the corresponding channel preselection signal g has already been at LOW level by the channel selection signal j. Accordingly, if the corresponding switching element of the channel selection switch 1 is closed, the channel preselection signal g is not changed so that it can not be detected whether the switch 1 was operated or not. An on-off detection circuit of the channel selection switch 1 is provided to supplement and avoid the above defect.

Figure 3:
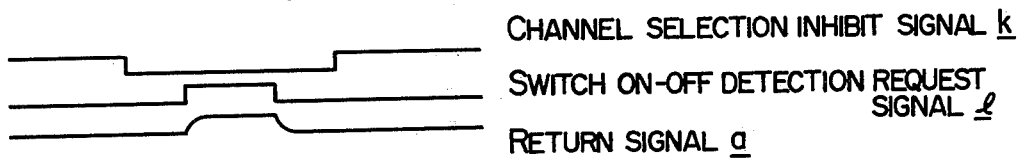
Figure 4:
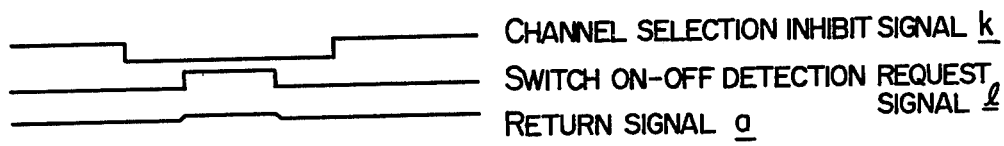

The timing relation of the on-off detecting operation will be described with reference to FIGS. 3 and 4, in which FIG. 3 shows the timing relation when all the switching elements of the channel selection switch 1 are open and FIG. 4 shows that when any one of the switching elements of the switch 1 is closed. Firstly, the memory control circuit 15 renders the channel selection inhibit signal k LOW level and turns off the transistor 24. Then, it renders its switch on-off detection request signal l HIGH to bias forwardly the diode 20. The comparator 21 of the voltage detection circuit judges whether the return signal a is HIGH or LOW to produce a switch on-off detection signal i. If the channel selection switch 1 is open, current flows through the diode 20 so that the return signal a becomes HIGH level. When the channel selection switch 1 is closed, current flows through resistor 19, diode 20, channel selection switch 1, diode 25 and decoder driver 10, and therefore the return signal a remains LOW. Thus the signal i indicating the signal a LOW is not obtained by closing switching elements for any channels other than that already held because of the reversely biased diodes 25. Upon the completion of the detection, the switch on-off detection request signal l is rendered LOW and the channel detection inhibit signal k is restored to HIGH level.

When the switch on-off detecting operation is effected with an opening state of the channel selection switch 1, the return signal a becomes instantaneously HIGH but this high level is absorbed by the resistor and capacitor of the integrator 13 and the counter 9 does not operate. The programmable channel selection apparatus according to the invention operates as mentioned above in the channel preselection mode. (4) Automatic video recording mode. In this mode, the channel preselected as in the previous manner is automatically read out and the corresponding selection voltage is generated by the selection voltage generating circuit 11 at the preset or preselected time. The holding of the channel at this time is effected by turning ON the transistor 24, as in the channel preselection mode. At the preset time, the memory control circuit 15 produces a pulse of the automatic channel selection signal c. The automatic channel selection c drives the counter 9 to operate through the OR gate 8 of the channel selection circuit 5. The number of pulses of the automatic channel selection signal c is determined by comparing the channel currently indicated by the channel selection signal j with the channel desired to be set. The operation of the channel indication and the tuner selection are the same as those in the previous case, and therefore the explanation thereof will be omitted.

Figure 5A:
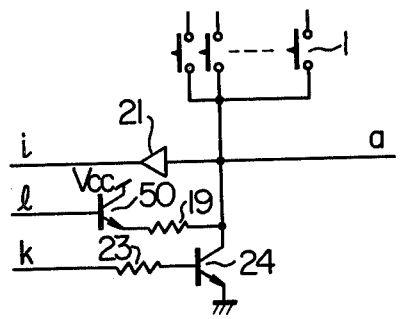
FIGS. 5A to 5D show modified circuit diagrams of a switch on-off detection circuit used in the embodiment of FIG. 1.
Figure 5C:
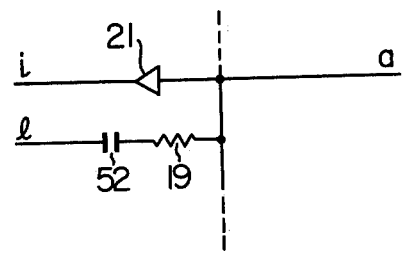
Figure 5B:
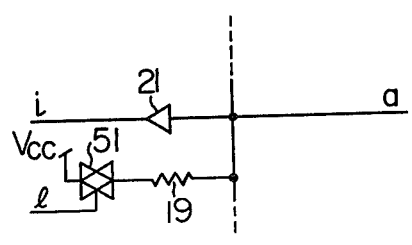
Figure 5D:
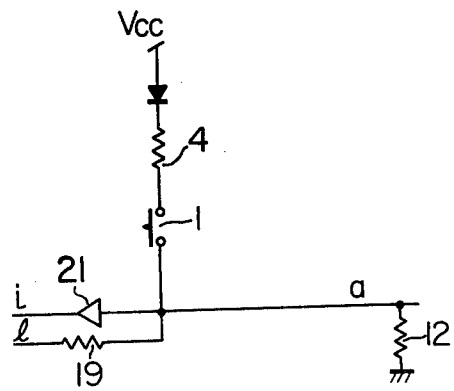

In the above-mentioned embodiment, the switch on-off detection circuit uses a resistor, a diode and a voltage comparator. However, as in FIGS. 5A to 5D, it may be realized by using a transistor, an analog switch, a capacitor, transistor and the like. In the examples in FIGS. 5A and 5B, a transistor 50, an analog switch or a tristate or three-state element 51 is used in place of the diode in the previous example, thereby to improve the current drive ability. The example shown in FIG. 5C utilizes the charging current of the capacitor 52 and is used when the drive ability of the switch on-off detection request signal l is large. FIG. 5D shows an example where the circuit construction is simplified by utilizing the voltage dividing ratio of resistors. In this case, the resistors must have the following relation regarding their resistance values, resistor 4 < resistor 19 < resistor 12. For example, when those are 100 Ohms, 1 K Ohms and 10 K Ohms, and Vcc is 5 V, the input voltage of the switch on-off detection circuit is nearly equal to 0.45 V when the channel selection switch is in ON condition, and it is nearly equal to 4.5 V when it is in OFF condition. Therefore, LOW and HIGH levels are distinguishable. This example is effective in such a case that the input impedance of the AND gate is high as in the case of MOS transistors.

Figure 6:
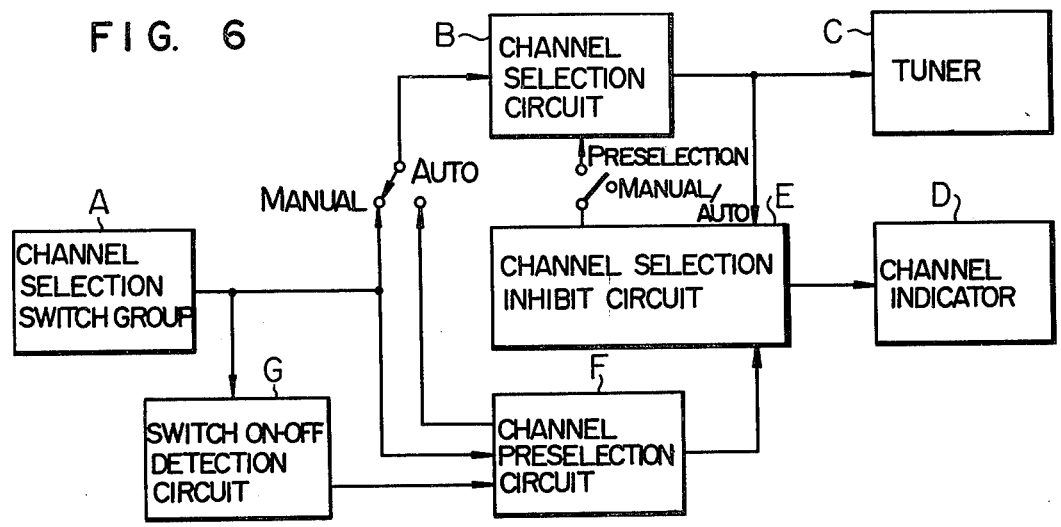
FIG. 6 shows a block diagram of the embodiment of FIG. 1 for generally explaining the embodiment shown in FIG. 1.

FIG. 6 which is a simplified diagram of the FIG. 1 example is described for generally explaining the above respective modes, wherein the selection switch group A corresponds to the channel selection switch 1 in FIG. 1, the channel selection circuit B to the channel selector 5, the tuner C to the tuner 26, the channel indicator D to the indicator 3, the inhibit circuit E to the circuits 22 and 25, the preselection circuit F to the preselector 14, and the switch on-off detection circuit G to the circuit 18.

(1) Manual Channel Selection Mode

In this mode, the channel selection circuit B is operated through the channel switch group A. By using the output signal of the channel selection circuit B, the tuner C is set to a given channel and the set channel is indicated by the channel indicator D.

(2) Channel Preselection Mode

In this mode, the channel selection inhibit circuit E inhibits the operation of the channel selection circuit B. The channel selection switch group A drives the channel preselection circuit F which stores a preselected channel and drives the channel indicator D. In this case, when the channel selected and held in the tuner is coincident with the channel preselected by the switch group A, a signal delivered from the switch on-off detection circuit G for detecting an on-off state of the switch group causes the channel preselection circuit to effect the preselection of the coincident channel.

(3) Automatic Channel Selection Mode

This mode causes the information stored in the channel preselection circuit F to operate the channel selection circuit F of which the output signal tunes the tuner C and at the same time causes the channel indicator D to indicate the selected channel.

As described above, in the present embodiment, a single system can control the channel indicator and the channel selection switch and the channel selection and holding operation is operable independently of the channel preselection operation.

Figure 7:
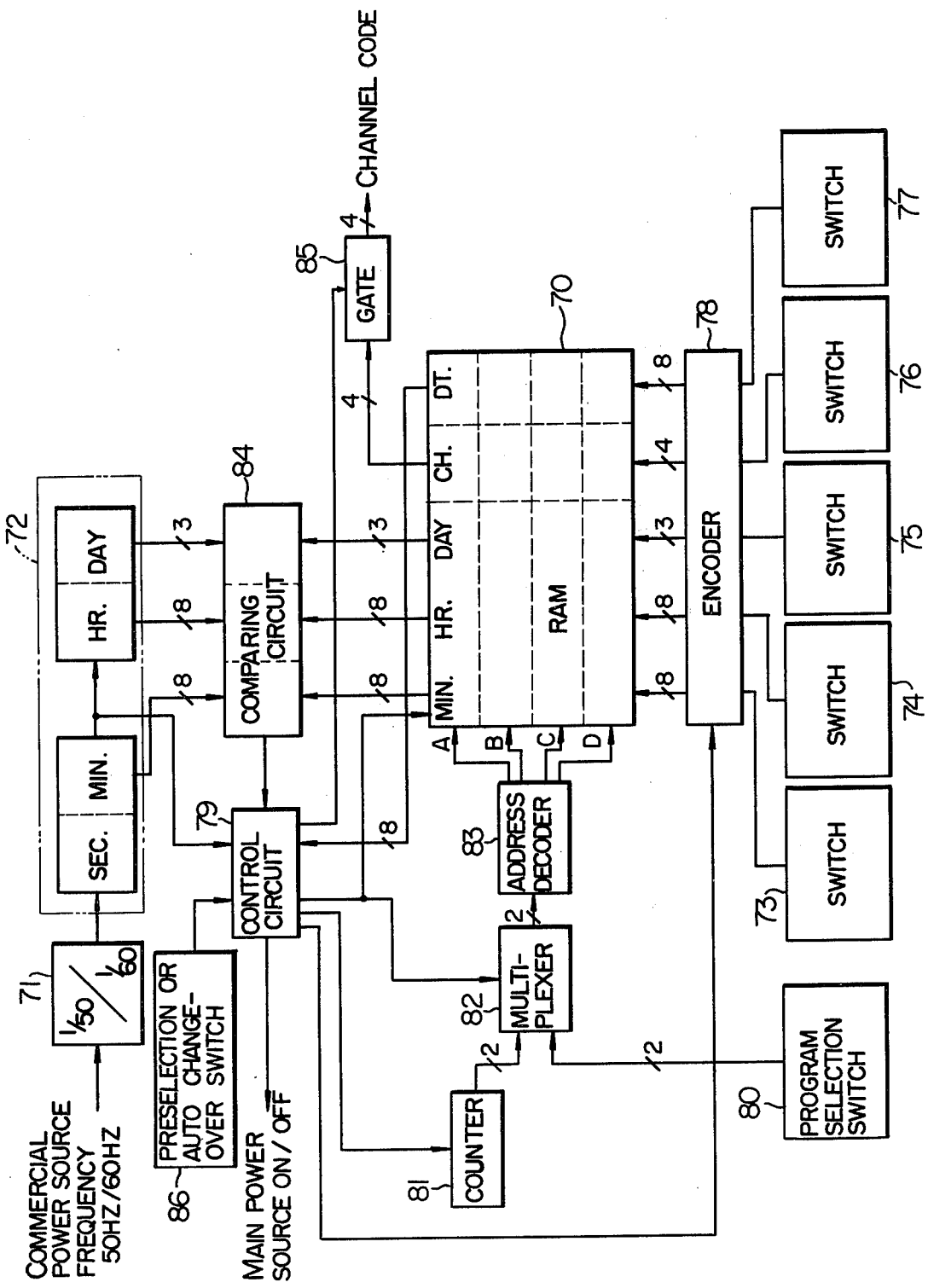
FIG. 7 shows a block diagram of a memory control circuit used in the embodiment shown in FIG. 1.

Turning now to FIG. 7, there is shown an example of the memory control circuit which stores a preset time and a preselected channel and produces a preselected channel signal stored at the preset time. Reference numeral 70 designates a RAM with a data storing area to which four addresses are assigned to store four program data as one example. In the respective storing areas are stored a program data including minute (3bits), hour (8 bits), day (3 bits), channel (4 bits) and video recording time length (8 bits). A wave-shaping circuit 71 wave-shapes a commercial power source frequency signal and applies it to a clock 72. The clock 72 frequency-divides the commercial power source frequency to form minute, hour and day signals. Reference numerals 73 to 76 are time presetting switches (corresponding to the switch 17 in Fog. 1) presetting minute, hour, day and video recording time length. Numeral 77 stands for a channel selection switch (corresponding to the switch 1 in FIG. 1). An encoder 78 encodes the preset time and the preselected channel inputted by switches 73 to 77 respectively into 8, 8, 3, 4 and 8 bits. The encoded signals are input into RAM 70 under control of the control circuit 79. A program selection switch 80 produces an address selection signal of 2 bits for selecting the memory area in the RAM 70 from the four addressed memory areas, for the purpose of storing the data. A counter 81 produces an address selection signal of 2 bits for successively designating the four data storing areas in the automatic channel selection mode. The address designating signal is so controlled by a control circuit 79 that it designates all the four data storing areas every one minute. A multiplexer 82 is so controlled by the control circuit 79 that, in the channel preselection mode, it permits an address selection signal from the program selection switch 80 to pass therethrough and in the automatic channel selection mode, it permits an address selection signal from the counter 81 to pass therethrough. An address decoder 83 decodes a 2-bit address selection signal selectively delivered from the multiplexer 82 into an address signal for designating each data storing area in the RAM 70. A comparing circuit 84 compares by every one minute in the automatic channel selection mode, the instant time signal (minute, hour, day) of the clock 72 with data (minute, hour, day) read out from the respective data storing area of the RAM 70. When these are coincident each other, it produces a coincident signal to the control circuit 79. The control circuit 79 controls the multiplexer 82 so that the address selection signal derived from the program selection switch 80 is applied to the address decoder 83. The control circuit 79 also controls it in order that the data such as preset time and preselected channel encoded by the encoder 78 is stored into the data storing area of RAM 70. The circuit 79 sends to the counter 81 every minute a signal to form an address selection signal for designating the four data storing area while at the same time controls the multiplexer 82 so that the address selection signal produced by the counter 81 is applied to the address decoder 83. The control circuit 79 effects a control such that data (minute, hour, day) read out from the data storing area designated by the address signal is applied to the comparing circuit. When receiving the coincidence signal from the comparing circuit, it controls the counter 81 and the multiplexer 82 so as to read out the channel and the recording time length from the data storing area where the coincident data (minute, hour, day) is stored and it controls the gate circuit 85 so that a channel code signal is output through the gate circuit 85. The control circuit turns off the main power source after the lapse of the read-out recording time length. Reference numeral 86 designates a preselection/automatic channel selection mode change-over switch.

Figure 9:
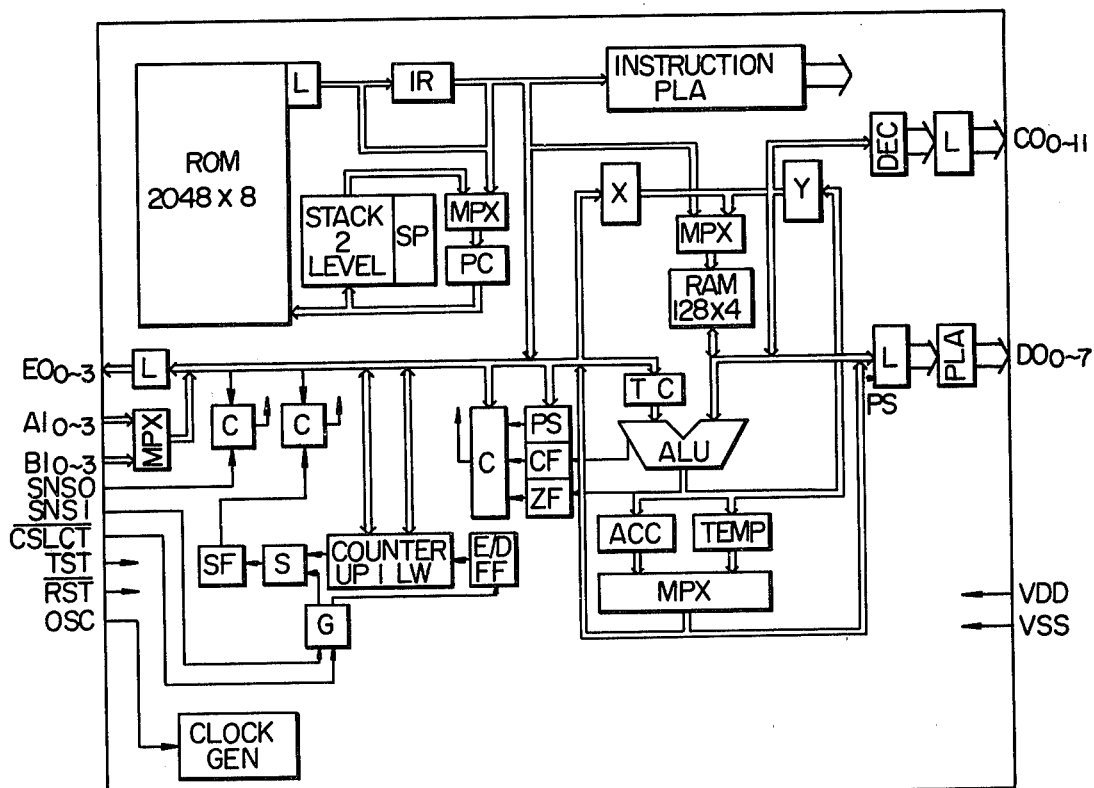
FIG. 9 shows in block form a system construction of the microcomputer used in the embodiment of FIG. 8.
Figure 8A:
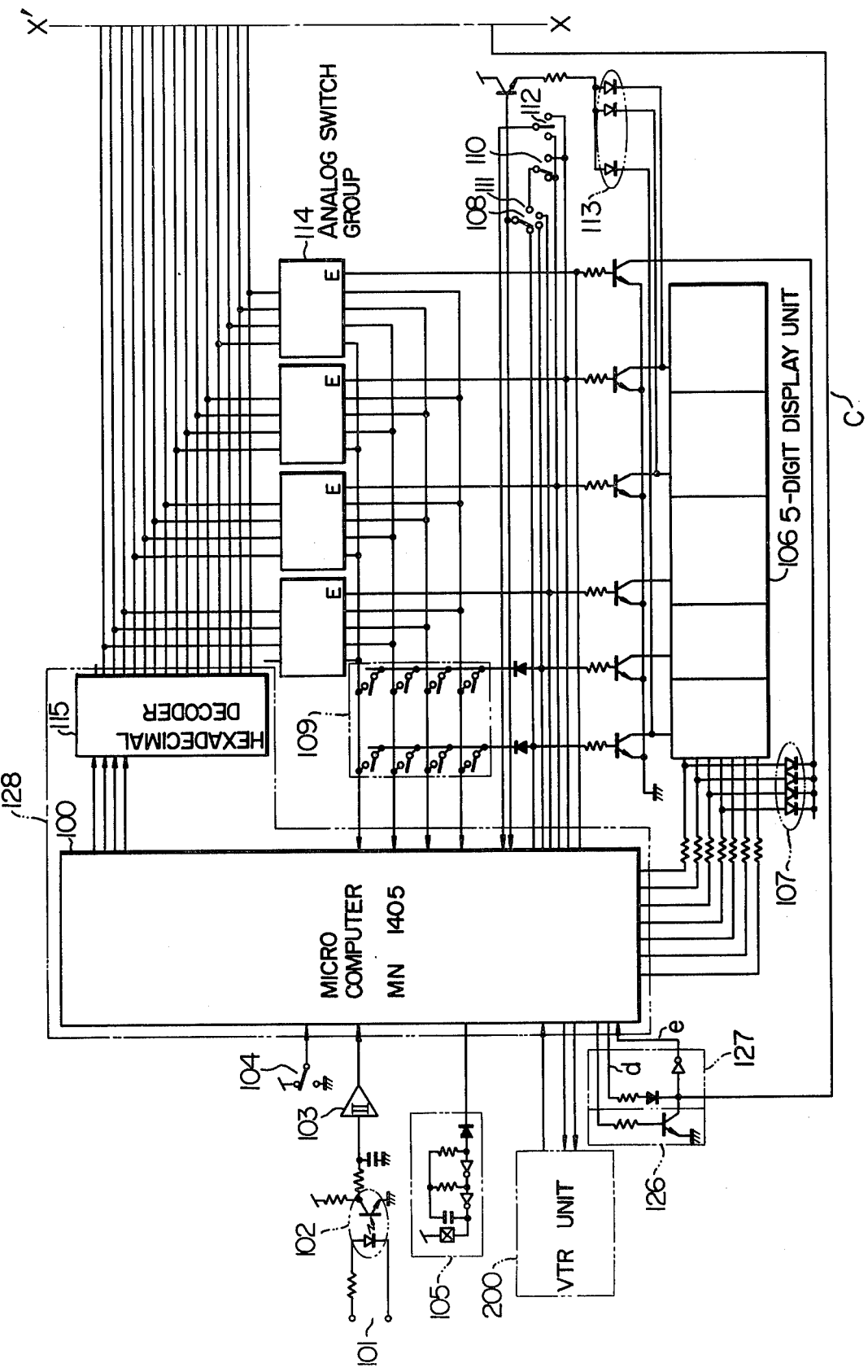
FIGS. 8A and 8B cooperate to form a block diagram of another embodiment of the programmable channel selecting apparatus according to the invention, in which a microcomputer is used in a memory controller circuit used in the embodiment shown in FIG. 1 and a preselected channel is indicated in flashing manner.
Figure 8B:
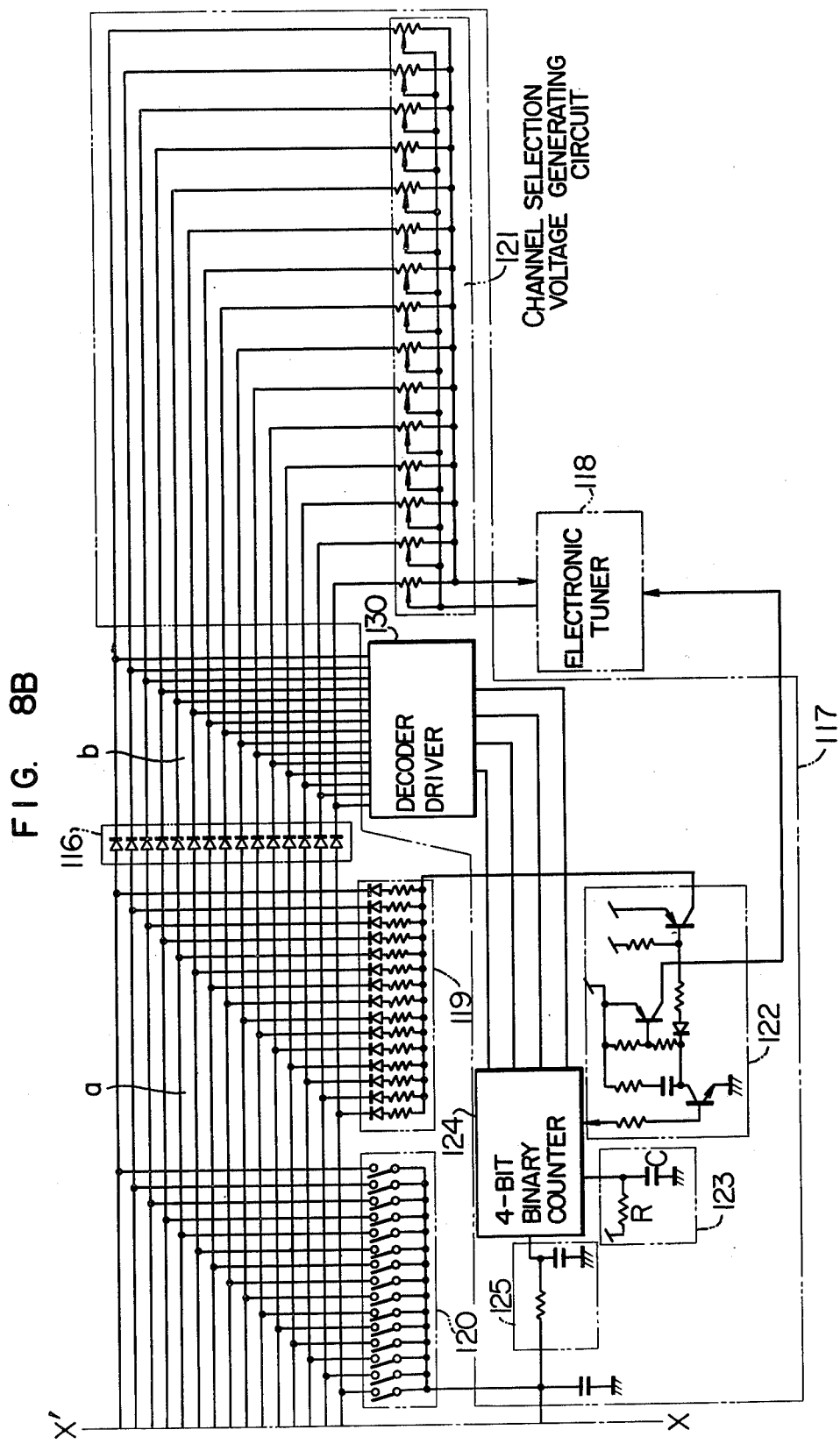

Turning now to FIG. 8, there is shown another embodiment of the programmable channel selection apparatus according to the invention in which a microcomputer MN 1405 manufactured by Matsushita Electronic Industry Co. Ltd. is used for the memory control circuit. In the drawing, FIGS. 8A and 8B must be coupled each other aligning X–X' of one with X–X' of the other to complete the circuit diagram. A microcomputer 100 is programmed so as to systematically perform clocking function, storing of the preselection contents, indication control, key input control, VTR control, tuner control and the like. A commercial frequency power source with 50 or 60 Hz input from input terminals 101 is applied as a time reference signal to the microcomputer 100, through a photocoupler 102 and a waveshaping Schmitt circuit 103. A switch 104 selects 60 or 50 Hz of the reference frequency signal to be applied to the microcomputer 100. For example, when it is turned to the ground side (the lower side of the drawing) 50 Hz is selected, and when it is turned to the power source side (the upper side), 60 Hz is selected. One of the output lines of the microcomputer 100 is connected to a buzzer unit 105. The microcomputer 100 is coupled with the VTR unit 200, through two output lines and one input line. Through these lines, the microcomputer 100 sends to the VTR a drive signal and an index signal and receives a VTR state signal from the VTR 200. The microcomputer has the other output lines of seven through which it drives a 5-digit display unit 106 of seven-segment type and a group of LEDs 107. The display unit 106 displays present or instant time, preset time and date, recording time length and the like and the LED group displays a preset program sign (in this example, four programs can be displayed). A switch 108 selects operation modes of the apparatus of the invention (instant time display, manual operation, automatic video recording, program preselection) and is coupled with the microcomputer through four output lines and one input line. A switch group 109 designates a preselected program sign, minute and hour and is of a so-called key scanning type, being coupled with the microcomputer 100. A switch 110 coupled with the preselection mode (switch position 111) of the switch 108 to designate the preselection of a record starting time or a record time length. A switch 112 designates a date. An LED group 113 indicates the display contents of the display unit 106 such as present time, record starting time, record time length, and is related to the switches 108 and 110. The digit scanning of the display unit 106 is effected with the scanning of the analog switch group 114, the switches 108, 110 and 112, LED groups 107 and 113. The output of the microcomputer 100 is connected to the channel selection circuit 117, through a hexadecimal decoder 115 and a diode group 116 forming a second inhibit circuit. The channel selection circuit 117 delivers a tuning voltage to the electronic tuner 118 and controls it. The hexadecimal decoder 115 has 16 output lines. In those output lines, fifteen lines are correspondingly related to channel signals and a single one is used as an "empty" line. These channel lines or the empty line is selected by the program of the microcomputer 100. This decoder also operates as a flash drive circuit of the channel display LED group 119. When the flashing is not necessary in the display operation, all the 16 output lines may be assigned to the channels. In the figure, 120 represents a channel selection switch, 121 represents a channel selection voltage generating circuit, 122 a muting circuit for preventing an erroneous operation of the electronic tuner 118 and the channel display LED group 119 when the channel selection circuit 117 is operating for the channel selection; 123 an oscillating circuit, 124 a 4-bit binary counter, 125 an integrating circuit, 126 a first inhibit circuit, and 127 a switch on-off detection circuit, and 130 a decoder driver circuit. The microcomputer 100 and the hexadecimal decoder 115 form the channel preselection circuit 128. FIG. 9 shows a system block diagram of the MN 1405. The operation of the above embodiment is the same as that of the FIG. 1 embodiment, except that the preselected channel is displayed by the channel display unit in flashing manner. The flashing display eliminates confusion in discriminating the indications of a channel selected and held and a preselected channel, even when the same channel display unit is used.

We claim:

1. A programmable channel selecting apparatus for enabling a channel preselecting and an instant channel selecting operation for an electronic tuner, comprising:

a plurality of manually-operable channel-selecting switches and a channel indicator means corresponding respectively to a plurality of channels to be selected;

a channel selection circuit;

a channel preselecting means;

an inhibit means for preventing disturbance of a selected channel;

common signal lines connecting said channel-selecting switches, said channel selection circuit and said channel indicator means respectively, and said channel-selecting switches, said channel preselecting means and said channel indicator means respectively and, clock means for providing data representing current time;

said channel selection circuit including means for generating and holding a channel selecting signal corresponding to any one of said switches which is manually operated, said channel selecting signal being immediately applied to said electronic tuner when generated;

said channel preselecting means including a manually-operable input switch means for inputting a channel preselecting time, and microcomputer means including memory means for storing data representing a channel preselecting time inputted by said input switch means together with a signal indicative of a channel preselected by any one of said channel-selecting switches, said microcomputer means detecting when a current time from said clock means is coincident with data representing a channel preselecting time stored in said memory means and for causing said channel selection circuit to generate and hold a channel selecting signal corresponding to the preselected channel;

said inhibit means being responsive to said microcomputer means for preventing said channel selection circuit from being influenced by the channel preselecting operation; and, said channel indicator means differentially indicating at least one channel corresponding to and according to at least one of the channel selecting signals held by said channel selection circuit and the preselected channel indicating signal stored by said memory means.

2. A programmable channel selecting apparatus for enabling a channel preselecting and a channel instant selecting operation for an electronic tuner, comprising:

a manually operated channel selection switch;

a manually operated preset time inputting switch;

a channel display means for displaying channels selected and preselected;

a channel selection circuit for driving said channel display means and a tuner in accordance with the channel selected by said channel selection switch in a manual video-recording mode, and in accordance with the channel preselected in an automatic channel selection mode;

a channel preselection circuit which, in a channel preselection mode, stores the preselected channel selected by said channel selection switch and the preset time inputby said preset time input switch, and drives said channel display means to display the preselected channel, and, in an automatic channel selection mode, applies the channel signal stored to said channel selection circuit when current time reaches the preset time stored;

a first prohibit means, which is controlled by said channel preselection circuit, for prohibiting the preselected channel signal selected by said channel selection switch from being applied to said channel selection circuit in the channel preselection mode; and, a second prohibit means for prohibiting the preselected channel signal, which is applied from said channel preselection circuit to said channel display means for displaying the preselected channel, from being applied to said channel selection circuit in the channel preselection mode;

wherein said channel selection switch, channel display means, channel selection circuit and channel preselection circuit are commonly connected to common signal lines.

* * * * *